United States Patent Office 3,850,900
Patented Nov. 26, 1974

3,850,900
PROCESS FOR MICRO-CRYSTALLIZATION OF POLYVINYLIDENE FLUORIDE ARTICLES
Masahiro Segawa, Iwaki, Japan, assignor to Kureha Kagaku Kogyo Kabushiki Kaisha, Tokyo-to, Japan
Continuation of abandoned application Ser. No. 830,799, June 5, 1969. This application Oct. 2, 1972, Ser. No. 294,300
Claims priority, application Japan, June 10, 1968, 43/39,872
Int. Cl. C08f 3/22
U.S. Cl. 260—92.1
2 Claims

ABSTRACT OF THE DISCLOSURE

A process for rendering polyvinylidene fluoride articles to a very fine crystal structure by heating them to a temperature higher than the melting temperature to remelt at least a portion thereof, and then by gradually cooling the articles.

---

Figure 1:
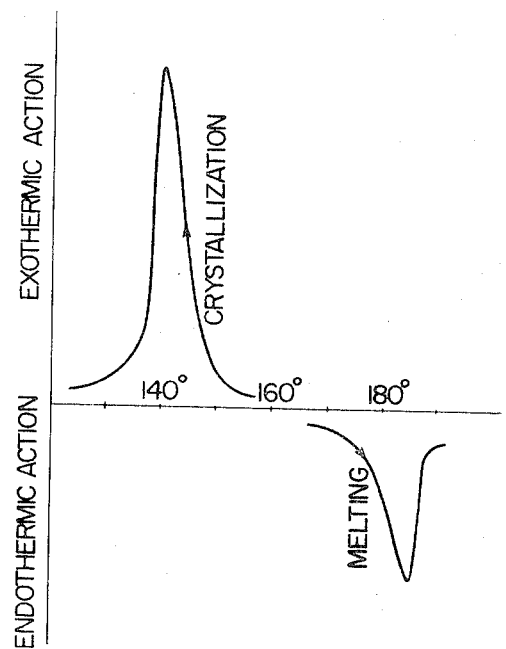

This is a continuation of application Ser. No. 830,799, filed June 5, 1969, and now abandoned.

BACKGROUND OF THE INVENTION

This invention relates to a treatment of polyvinylidene fluoride articles. More particularly, the invention is concerned with a melt-processing of polyvinylidene fluoride articles with a view to obtaining micro-crystal structure therein.

As is already known, polyvinylidene fluoride has various excellent properties such as anti-weathering, anti-chemicals, and wear-resistance, large mechanical strength as well as easiness in melt-processing. For this reason, polyvinylidene fluoride has been drawing considerable attention in recent years as the materials for moldings, coating, etc.

On the other hand, polyvinylidene fluoride is of such nature that, on account of its strong crystallizability, development of crystals varies depending on the cooling method after its melting, i.e., when quenched, very fine crystals produce giving lustrous surface to the finished product. However, when it is cooled slowly, large sphered crystals are resulted, and the surface of the finished products is rough and turbid in white, which is liable to create small cracks among these sphered crystals. These cracks, if they appear in shaped articles and coatings would lower the mechanical strength. If they appear in the material to be used for anti-corrosion purposes, such cracks would unavoidably make the material useless. It is therefore desirable that, in melt-processing of polyvinylidene fluoride, crystal structure of the material be rendered into the finest possible. However, the quenching (or rapid cooling) of polyvinylidene fluoride is not always possible in all the articles made of the polymer material such as shaped articles of heavy thickness, coatings for tanks or vessels of large capacity, etc. Rather, it is advisable to cool these articles slowly after melting in order that internal strains to be created in the shaped articles and coatings may be reduced to the minimum possible.

As a method for micro-crystallizing the polymers which tend to develop large sphered crystals, there has usually been known to add an appropriate crystal nucleating agent for each polymer. As the effective crystal nucleating agent for polyvinylidene fluoride, there have been found terephthalic acid, caoline, talc, etc. as already proposed in now abandoned U.S. patent application No. 747,863 of the same applicant. Addition of terephthalic acid, however, produces shaped articles and coatings which are turbid in white, and addition of caoline, and talc containing as one of its components anhydrous silicic acid easily causes thermal decomposition of polyvinylidene fluoride at the time of its melt-processing.

As a result of continuous research and study of micro-crystallization of polyvinylidene fluoride, it has been found possible to obtain such extremely fine crystal structure by simply controlling heat treatment after melt-processing without addition of any crystal nucleating agent whatsoever. According to this melt-processing, there accompanies an advantage such that transparency of the shaped articles and coatings improves remarkably.

SUMMARY OF THE INVENTION

It is therefore an object of the present invention to provide a process for micro-crystallization of polyvinylidene fluoride articles by regulating temperatures for melt-processing of the articles made of the polymer without addition of any crystal nucleating agent.

It is a second object of the present invention to provide a unique melt-processing of polyvinylidene fluoride, wherein once crystallized polyvinylidene fluoride articles of any configuration are heated to a temperature higher than the temperature, at which the articles begin to melt so as to re-melt a part or the most part of the crystal structure, and thereafter the re-melted articles are subjected to gradual cooling to obtain shaped articles or coatings of polyvinylidene fluoride having extremely fine crystal structure.

BRIEF DESCRIPTION OF THE INVENTION

Figure 2A:
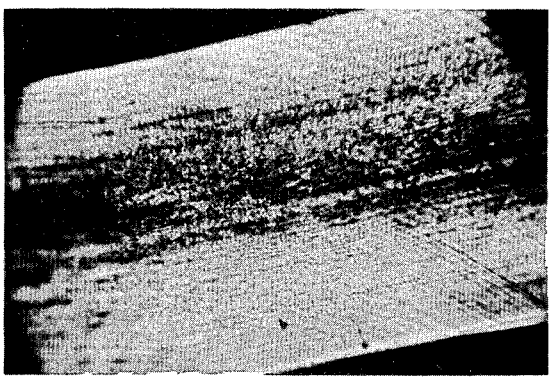
Figure 2B:
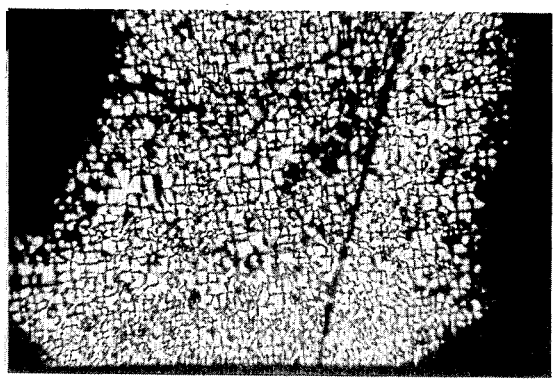
Figure 2C:
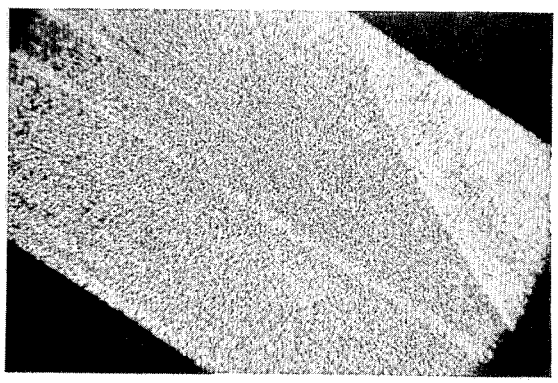

The foregoing objects and other objects of the present invention will become more apparent from the following description of the present invention when read in conjunction with the accompanying drawing, in which:

FIG. 1 is one example of differential thermal analysis curves of polyvinylindene fluoride; and FIGS. 2(a), 2(b), and 2(c) are respectively micro-photographs taken by a polarization microscope of cross-sections of polyvinylidene fluoride sheets formed by compression-molding, wherein FIG. 2(a) indicates the crystal structure of the sheet obtained by water-cooling it from its molding temperature; FIG. 2(b) indicates the crystal structure of the sheet obtained by leaving it in the air to cool down from its molding temperature; and FIG. 2(c) indicates the crystal structure of the sheet same as that of FIG. 2(b), which was subjected to re-melting process at a temperature of 190° C., and then left to cool in the air.

DETAILED DESCRIPTION OF THE INVENTION

Among known fluorine-containing polymers, polyvinylidene fluoride is one that is the most highly melt-processable. Products of various shapes and configurations can be easily obtained from powders or pellets of polyvinylidene fluoride by ordinary compression-molding, injection molding, etc. Also, anti-corrosion coatings can be easily applied to metal articles by a fluidized bed coating method, flock-coating method, and so forth. Although somewhat different depending on the polymerization method and the degree of polymerization of polyvinylidene fluoride to be used, these molding and coating treatments are usually carried out at a temperature of 220° C. to 300° C. A temperature lower than this range makes it difficult to produce coatings having no pin-holes and shaped articles of high mechanical strength, because melt-adhesion of the pellets or powders is still insufficient at this temperature. On the contrary, a temperature higher than this range causes commencement of thermal decomposition of polyvinylidene fluoride during the melt-processing of the articles. Subsequent to the molding or coating treatment, polyvinylidene fluoride in a molten state is subjected to cooling and solidification. This second treatment is done by plunging the articles into water or pouring water thereover to quench to create crystals of about 1 micron in diameter and a lustrous surface. At this quenching process, however, there will occur from time to time some abnormalities on the articles such that, in the case of a compression-molded sheet, it is "curved" and is difficult to maintain a flat surface; in the case of a injected-molded article, voids are inclined to appear in the inner portion thereof, and in the case of coatings, foams are created therein at its corner parts where radius of curvature is small. Such phenomena appear remarkably as the thickness of the shaped articles and coating, etc. is large, but they can be eliminated by reducing the rate of cooling, though on the contrary, there is brought about another problem of large sphered crystals being produced to cause cracks in the articles. For instance, when a polyvinylidene fluoride article is left to cool in the air after its melt-processing, sphered crystals of about 50 microns in diameter are produced, which give rise to a rough surface in the case of a compression-molded sheet of 1 mm. thick. Further, in the case of coatings applied to the inner surface of the valve body, the cooling rate becomes far slower than in the preceding case, and the crystals also become larger to such an extent that pin-holes are finally detected upon close inspection. When the rate of gradual cooling is further slowed down with a view to reducing deformations generated in the course of cooling (for example, gradual cooling conducted in a heating furnace), the diameter of the sphered crystals reaches 100 microns or so and a great deal of cracks become observable by naked eyes.

Researches and experiments conducted by the present inventor on the melt-processing of polyvinylidene fluoride have disclosed that, when once crystallized shaped articles or coatings are heated to a temperature, at which polyvinylidene fluoride begins to melt, preferably in the range of from the melting temperature of the respective articles to a temperature higher than their melting temperature by 10° C., to re-melt at least one portion of the crystallized articles, and then are gradually cooled, those articles turn into those having extremely fine crystal structure. In other words, when an article of polyvinylidene fluoride, which was once crystallized by gradual cooling into large sphered crystals of 50 to 100 microns in diameter, is heated to a temperature somewhat higher than the melting point of polyvinylidene fluoride to re-melt the crystals and is then cooled down gradually, the subsequently produced crystals become extremely fine ones of approximately 1 micron in diameter, and the surface of the article is lustrous (or bright) as if it were obtained from ordinary water-cooling treatment, let no strain due to the crystallization can be observed at all.

Here, the terms "temperature, at which melting begins (or, commencing temperature for melting)" and "melting point" are respectively defined by "a temperature, at which endothermic action starts" and "a temperature at the peak in the endothermic action" obtained by measuring the differential thermal analysis curve of polyvinylidene fluoride. The actual temperature thereof varies slightly depending on the manufacturing conditions, particularly polymerization conditions. For example, FIG. 1 is the differential thermal analysis curves of polyvinylidene fluoride polymer obtained by suspension-polymerization of polyvinylidene fluoride at a temperature of 25° C. (rate of increase or decrease of temperature is 3° C. min. in the differential thermal analysis). From the curve of endothermic action (melting curve), it will be understood that the temperature, at which melting commences, is about 170° C., and, the melting temperature is 185° C. Polyvinylidene fluoride obtained by emulsion-polymerization at 110° C. begins to melt at a temperature of about 155° C. and its melting point is 170° C.

Now observing the phenomenon taking place in the course of the melt-processing according to the present invention, the following inference can be drawn. Since polyvinylidene fluoride has strong crystallizability, once it is cooled to crystallize, its crystal structure may probably not be completely destroyed by being simply heated to its melting temperature or to a temperature higher than the melting point by 10° C. or so, though it assumes apparently a molten state. Rather, in the course of subsequent cooling, these crystals work as countless numbers of crystal nuclei with the consequence that fine crystals are produced upon gradual cooling.

It is to be noted that the method of this invention is also effectively applicable to a process using solution, organo-sol, or dispersion of polyvinylidene fluoride. This fluorine-containing polymer scarcely dissolves into any organic solvent at a normal temperature with the exception that it slightly dissolves in dimethylformamide, dimethylacetoamide, or the like. As it is not possible to obtain generally a tough film by simply volatilizing the solvent from the polymer solution, there has usually been adopted a method, wherein, after a film is obtained by volatilizing the solvent, it is further heated above the melting temperature of polyvinylidene fluoride and then is cooled.

Organo-sol of polyvinylidene fluoride is such one that fine particles of the polymer are dispersed in an organic solvent which does not dissolve polyvinylidene fluoride at a normal temperature, but dissolves it at an elevated temperature. In comparison with a solution, as the organo-sol is characterized in its high concentration and low viscosity, its processing into the final product also follows the steps of heating the sol to set to a film, further heating the film at a temperature above the melting point of the polymer, and finally cooling.

Dispersion of polyvinylidene fluoride is such one that fine powders of the polymer are dispersed in a medium of non-solvent nature. Processing of the polymer is carried out by first volatilizing the medium leaving a layer of the polymer in fine particles, then heating the polymer at a temperature above its melting point to render it into a molten, continuous film, and finally subjecting the film to cool. That is, polyvinylidene fluoride, whatever form it may take—solution, organo-sol, or dispersion—is usually processed by first rendering it into a molten state, and then subjecting it to cool. Accordingly, if the polymer in molten state is quench-cooled after melting, extremely fine crystal structure will result. On the other hand, however, if it is cooled slowly, large crystals are produced. Therefore, in order to obtain very fine crystal structure by gradual cooling, the process of this invention can be safely adopted.

An important point in carrying out the process of this invention is that re-melting of the polymer material once crystallized by a cooling operation, etc. is conducted at a temperature range of from the commencing temperature of melting of polyvinylidene fluoride to a temperature higher by 10° C. than the melting point of the polymer. In this case, if the crystallized polyvinylidene fluoride possesses relatively large crystals obtained by gradual cooling, the temperature for the re-melting is preferably a temperature higher than the melting point of the polymer. At less than this temperature, large crystals are difficult to re-melt, hence uniform micro-crystallization of the product can hardly be realized. On the other hand, however, if shaped articles or coatings of polyvinylidene fluoride are produced by initially quenching the polymer material so as to be micro-crystallized, the re-melting operation can be carried out at about the commencing temperature of melting of polyvinylidene fluoride. The reason for this is that the fine crystals obtained from the initial quench-cooling need not always be melted entirely at the re-melting, and the second cooling is mainly purported to remove strains in the articles.

It should be noted further that, when the re-melting temperature is elevated excessively high in order to completely melt the crystal structure of polyvinylidene fluoride in the molten articles, no fine crystals can be obtained from slow cooling. However, even if the melting temperature is excessively elevated, it may not be possible to re-melt the polyvinylidene fluoride articles leaving therein the crystal structure, provided that the heating time is short. In general, however, when the heating is conducted at a high temperature for a short period of time, re-melting tends to be nonuniform, hence it is advisable to conduct re-melting at a temperature higher than the melting point of polyvinylidene fluoride by 10° C. or less.

In carrying out the present invention, no temperature of the shaped articles or coatings to be subjected to re-melting is questioned. That is, the articles need not always be cooled to a normal temperature, but they may be at any temperature in the course of the cooling, at which the crystal structure is created.

The initial cooling may be either slow cooling or rapid cooling, although it goes without saying that the gradual (or slow) cooling is preferable in the case of shaped articles of heavy thickness which are apt to be deformed by quench-cooling. As seen in FIG. 1, polyvinylidene fluoride is of such properties that it is rapidly crystallized at a temperature of less than 160° C., particularly in the vicinity of 140° C. Therefore, those articles that have been cooled below this temperature can be suitably used for the process of this invention.

It is also possible to conduct the process of this invention repeatedly, twice or more. Furthermore, as the powders of polyvinylidene fluoride obtained from polymerization are already in crystallized state by themselves, it can be directly processed from the material powders into compression-molded sheets of very fine crystal structure. That is, when the polyvinylidene fluoride powder material is caused to melt at the melting temperature thereof or at a temperature higher than the melting temperature by 10° C., is then subjected to compression-molding, and is finally cooled, a finely crystallized sheet of polyvinylidene fluoride having good transparency can be produced. This process may easily be understood as one application of the present invention.

In the practice of the process according to the present invention, it is of course permissible to add a nucleating agent effective to the micro-crystallization of polyvinylidene fluoride. Also, any pigment, dye, or filler may be safely used without influence on the effect of this invention.

PREFERRED EMBODIMENTS OF THE INVENTION

In order to enable those skilled in the arts to reduce the present invention into practice, the following actual examples are given.

EXAMPLE 1

Three kinds of sheet were produced from polyvinylidene fluoride powder material by a compression-molding apparatus. Each of these sheets underwent three different kinds of cooling processes.

The polyvinylidene fluoride powder material was produced by suspension-polymerization at a temperature of 25° C., which possessed the undermentioned properties.

Particle size: 50–200$\mu$
Apparent specific gravity: 38 g./dl.
Melting temperature: 185° C.
Inherent viscosity: 1.03

In the above, the inherent viscosity $\eta_i$ takes a value represented by the following equation.

$$\eta_i = \frac{1}{C} \ln\left(\frac{\eta}{\eta_0}\right)$$

where: $\eta$ denotes viscosity (at 30° C.) of dimethylformamide solution of polyvinylidene fluoride having concentration of 0.4 g. per 100 cc.; $\eta_0$ denotes independent viscosity of dimethylformamide; ln is a natural logarithm; and C is a value 0.4.

18 gr. of polyvinylidene fluoride powder material was placed in a cavity of a stainless steel frame of 10 cm. x 10 cm. x 1 mm. The upper and bottom openings of the frame were closed by a hard-chrome plated sheet, and the whole batch was heated to 250° C. During the first 3 minutes of heating, no pressure was imparted thereto, but, for the subsequent 5-minute heating, a pressure of 100 kg./cm.$^2$ was applied to the batch under treatment. The content was taken out upon relieving the pressurized state to a normal pressure state, after which three kinds of polyvinylidene fluoride sheets of 10 cm. x 0 cm. x 1 mm. were prepared under different cooling processes, as follows:

(a) Quench-cooling by plunging the material into water at 20° C., (b) Gradual cooling by leaving the material in air at 23° C.

(c) Gradual cooling by leaving in air the material previously cooled by the above process (b) after it was re-melted in a heating furnace of 190° C.

The last cooling process (c) corresponds to the present invention.

The respective polyvinylidene fluoride sheets obtained by the abovementioned three cooling processes (a), (b), and (c) had their conditions as shown in Table 1.

TABLE 1

| | Cooling processes | | |
|---|---|---|---|
| Conditions of sheet | a. water-cooled | b. air-cooled | c. present invention |
| Deformation | Yes | No | No |
| Size of crystal ($\mu$) | >1 | 50–100 | 1 |

Cross-sections of these sheets which were subjected to the different cooling processes (a), (b), and (c) were photographed by a polarization microscope as shown in FIGS. 2(a), 2(b), and 2(c), respectively.

EXAMPLE 2

By the cooling process (b) above, three polyvinylidene fluoride sheets were prepared, each of them was then placed in heating furnaces of (1) 180° C., (2) 190° C., and (3) 200° C., respectively.

After lapse of two hours, the sheets placed in the furnace (2) and (3) were recognized to have been re-melted, but the sheet placed in the furnace (1) was merely softened. The sheets were then taken out of the furnaces and left to cool in the air. Only the sheet re-melted at 130° C. was successfully micro-crystallized.

Further, three polyvinylidene fluoride sheets were produced by the cooling process (a) in Example 1. Each of these sheets was sandwiched between two iron plates and heat-treated under the same conditions as in the abovementioned three sheets produced by the cooling process (b).

After two hours passed by, the sandwiched sheets were left to cool in the air, and then the iron plates were removed. No deformation, or curvature, could be recognized. Of these three, those treated at 180° C. and 190° C. were finely crystallized to about 1 micron or so, but the sheet treated at 200° C. possessed the crystal size of 50–100 microns.

EXAMPLE 3

With polyvinylidene fluoride powder, a coating was applied to the inner surfaces of the bodies of three diaphragm valves of 5 cm. diameter. The polyvinylidene fluoride powder used was just the same as that of Example 1. The valve bodies were cleansed beforehand by removing rust through sand-blast method, and then subjected to preliminary heating for 30 minutes in a heating furnace of 250° C. Thereafter, the material powder was applied to the inner surfaces of the respective valve bodies by means of a flock-gun. When thickness of the coatings reached 0.2 mm. or so, the articles were again placed in the heating furnace of 250° C. and heated for 30 minutes to completely melt the material powder. These operations were repeated five times until the total film thickness became 1 mm. or so, only the last heating having been continued for 60 minutes.

Upon completion of the heating, each of the three valve bodies was subjected to the following respective cooling operations.

(a) Quench-cooling by plunging the valve body into water at 20° C.

(b) Gradual cooling by leaving the valve body in air at 23° C.

(c) Gradual cooling by leaving in air the valve body previously cooled by the above process (b), after it was heated for four hours in a heating furnace at 190 C. to re-melt the coatings and taken out of the furnace upon verification of the re-melting.

The last cooling process (c) corresponds to the present invention.

The conditions of the respective coatings which have undergone the above-mentioned three cooling processes (a), (b), and (c) are as shown in the following Table 2.

TABLE 2

| Conditions of coating | Cooling processes | | |
|---|---|---|---|
|  | a. water-cooled | b. air-cooled | c. present invention |
| Foaming at corners | Many | No | No. |
| Pin-holes * | No | Yes | No. |

*Measurement was done by a pin-hole tester using D.C. high voltage oltage of 10 kv.

When the cross-sections of the coatings were observed through a polarization microscope, it was verified that the coating which was subjected to the quench-cooling under (a) was finely crystallized at its outer surface part, but it had large sphered crystals at the inner surface part close to the iron valve, which suggests that the film structure is not uniform and there is brought about internal strain in the film; that the film treated by the cooling process (b) has produced large sphered crystals at both external and internal surface parts; and that the coating treated by the process of the present invention was finely crystallized at both external and internal surface parts.

What is claimed is:

1. A process for microcrystallization of polyvinylidene fluoride article in molded or coated form which consists of the steps of:

(a) heating an article consisting essentially of crystallized polyvinylidene fluoride which has once been heated to melt and then cooled to solidify at a temperature between a temperature at which the polyvinylidene fluoride begins to melt and a temperature approximately 10° C. higher than the melting point of polyvinylidene fluoride to remelt only a portion of the polyvinylidene fluoride article, while maintaining the original shape thereof as molded or coated; and (b) gradually cooling the article to create extremely fine crystals of polyvinylidene fluoride of approximately 1 micron in diameter.

2. The process according to claim 1, wherein polyvinylidine fluoride in the molded or coated article has the crystal size of from about 50 to 100 microns in diameter.

References Cited
UNITED STATES PATENTS

| | | | |
|---|---|---|---|
| 3,541,039 | 10/1970 | Waiton | 260—31.6 |
| 2,435,537 | 2/1948 | Ford et al. | 260—92.1 |
| 3,169,120 | 2/1965 | Capron et al. | 260—92.1 |
| 3,154,519 | 10/1964 | Iserson | 260—92.1 |

HARRY WONG, Jr., Primary Examiner

U.S. Cl. X.R.

117—161; 260—32.6 R